US006560615B1

(12) United States Patent
Zayas et al.

(10) Patent No.: US 6,560,615 B1
(45) Date of Patent: May 6, 2003

(54) METHOD AND APPARATUS FOR IMPLEMENTING A HIGHLY EFFICIENT, ROBUST MODIFIED FILES LIST (MFL) FOR A STORAGE SYSTEM VOLUME

(75) Inventors: Edward R. Zayas, Salem, UT (US); Sai Rama Krishna Susarla, Salt Lake City, UT (US)

(73) Assignee: Novell, Inc., Provo, UT (US)

( * ) Notice: Subject to any disclaimer, the term of this patent is extended or adjusted under 35 U.S.C. 154(b) by 0 days.

(21) Appl. No.: 09/466,359

(22) Filed: Dec. 17, 1999

(51) Int. Cl.[7] .............................................. G06F 17/30

(52) U.S. Cl. ...................................... 707/202; 707/204

(58) Field of Search ................................ 707/202, 204, 707/200, 104.1, 203

(56) References Cited

U.S. PATENT DOCUMENTS

| | | | | |
|---|---|---|---|---|
| 5,671,350 A | * | 9/1997 | Wood ............................ | 714/15 |
| 5,684,991 A | | 11/1997 | Malcolm ..................... | 395/620 |
| 5,758,359 A | * | 5/1998 | Saxon ......................... | 707/204 |
| 5,778,395 A | * | 7/1998 | Whiting et al. ................ | 707/10 |
| 5,822,780 A | * | 10/1998 | Schutzman ............... | 707/104.1 |
| 5,832,526 A | * | 11/1998 | Schuyler ..................... | 707/200 |
| 5,907,672 A | * | 5/1999 | Matze et al. ................. | 711/162 |
| 5,978,814 A | | 11/1999 | Miller et al. ................. | 707/203 |
| 5,991,753 A | * | 11/1999 | Wilde ............................ | 707/2 |

FOREIGN PATENT DOCUMENTS

WO        WO 95/01605        1/1995

OTHER PUBLICATIONS

Jeffrey Cooperstein and Jeffrey Richter, "Keeping an Eye on Your NTFS Drives: the Windows 2000 Change Journal Explained", Microsoft Systems Journal, Sep. 1999, pp. 17–28.

Knuth, "The Art of Computer Programming", vol. 3/Sorting and Searching in the Addison–Wesley Series in Computer Science and Information Processing, 1973, pp. 470–479.

Richard E. Schantz and Robert H. Thomas, "A Technical Overview of the National Software Works Project", Bolt Beranek and Newman Report No. 5238, Dec. 1982, pp. 1, 20, 39, 43, 53–55, 59–60, 79–82.

Felipe Cabrera, Selected Slides from a presentation at the Microsoft Professional Developer's Conference (San Diego, CA), 1997, pp. 1–3.

* cited by examiner

*Primary Examiner*—Safet Metjahic
*Assistant Examiner*—Haythim Alaubaidi
(74) *Attorney, Agent, or Firm*—Marger Johnson & McCollom PC

(57) ABSTRACT

When a volume is created, a Modified Files List (MFL) is established and an epoch timestamp, identifying an important point in time, is set for the volume. Entries are inserted into the MFL whenever files are first added to or changed on the volume. Entries are flagged with the epoch timestamp in which they are added to the MFL. Entries are removed from the MFL when files are restored to an already-archived condition or are deleted from the volume. A system administrator can declare a new epoch at any time, and will declare a new epoch before performing a backup. The system administrator will select an epoch for backup purposes. The files inserted into the MFL before the selected epoch timestamp are enumerated and archived using a backup tool. After the backup tool turns off a file's data and metadata archive bits, the corresponding entry is removed from the MFL.

20 Claims, 6 Drawing Sheets

US 6,560,615 B1

METHOD AND APPARATUS FOR IMPLEMENTING A HIGHLY EFFICIENT, ROBUST MODIFIED FILES LIST (MFL) FOR A STORAGE SYSTEM VOLUME

FIELD OF THE INVENTION

This invention pertains to backup data and more particularly to a technique to speed up backup operations.

BACKGROUND OF THE INVENTION

The task of quickly and efficiently backing up modern file storage systems is becoming more and more difficult, especially given the relentless increases in storage capacities along stratospheric growth curves. Storage hardware manufacturers now routinely produce compact, affordable rack-mounted systems sporting hundreds of gigabytes or even several terabytes. Software products make it equally routine to wrap the entire contents of such a system inside a single volume if so desired, supporting literally billions of individual files while maintaining high availability and failure recovery times for such a volume.

Backup technology has not even come close to keeping up with this explosive growth in storage. In particular, all major backup vendors still basically rely on brute-force searches to discover which files have changed since the last time they were archived. These searches generally result in a huge amount of wasted time and effort. Statistically speaking, only 20% of a system's files will likely have changed on any given day. What is worse, each and every file's metadata (data about the file) block must be read into memory and examined to see if it needs backup. Not only does this require massive numbers of I/O and processor cycles that could otherwise go towards servicing file system requests from users, but about 80% of this effort will be a complete waste of time.

An even bigger problem than the massive inefficiency described above is time. More and more organizations are discovering that they can no longer back up changes made to their data in a 24-hour period—there are too many files to search through, and too few hours in the day.

Normally, a backup agent performs a tree walk over the complete set of files in a volume. Each file thus encountered whose data or metadata bits (also called the file's archive bits) were turned on is locked and its contents stored to tape. Once safely on tape, the backup agent turns off the file's archive bits, unlocks it, and continues its tree walk.

As system administrators and users have discovered, this "normal" approach to incremental backups has critical problems. The worst of these is that the time required to walk a volume's file tree is proportional to the number of files present. This number can easily be in the billions in modern systems, and even the fastest processors and disk I/O systems will not be able to inspect all of a volume's files in any given 24-hour period. As if that is not enough, arbitrarily long "quiet" periods are possible during which the backup agent encounters nothing but unmodified files. The tape backup system cannot be kept busy during these potentially numerous and extended periods of time.

In fact, shoe-shining can occur during these quiet times due to the physical characteristics of tape drives. When the system runs out of data to write, the tape must be slowed and stopped, then rewound to a point significantly before the point of last write so that the tape can be brought up to streaming speed upon (eventual) receipt of the next write buffer. This back-and-forth motion over the tape heads reminds people of how shoes are buffed and polished. Shoe-shining only serves to wear down the tape head, strip oxide from the medium, and significantly reduce the overall backup throughput.

One alternative to the "normal" approach is to utilize a Change Journal, as described for the Microsoft® Windows® 2000 operating system. ("Microsoft" and "Windows" are registered trademarks of Microsoft Corporation in the United States and/or other countries.) In the article "Keeping an Eye on Your NTFS Drives: The Windows 2000 Change Journal Explained," published in the Microsoft Systems Journal, September 1999, Jeffrey Cooperstein and Jeffrey Richter say that the Windows® 2000 Change Journal is "... a database that contains a list of every change made to the files or directories on an NTFS 5.0 volume. Each volume has its own Change Journal database that contains records reflecting the changes occurring to that volume's files and directories."

The Change Journal is implemented as a single, system-protected-and-maintained, fixed-maximum-size sparse file. Each time a file is changed in some way, an entry is appended to this special file. Change Journal entries include a 64-bit Update Sequence Number (USN), the file's character string name, the time of the change, and the type of change that was made. Entries cannot span file blocks (typically 4K bytes), so some wasted space is possible per block. Entries are supposed to average about 100 bytes, but can be significantly larger if changed files have long pathnames. There may be multiple entries for any given file, as each change to the file is appended to the Change Journal as a separate record. Each change to a file requires not only that a distinct entry be added to the Change Journal, but that the file's entry in the volume's Master File Table (MFT) be persistently updated with that new entry's USN. Change Journals are disabled by default on Windows® NT 5.0 volumes. All applications have equal access to a volume's Change Journal, and any one of them may at any time enable or disable it. All records in the Change Journal are deleted each and every time it is disabled.

The Change Journal has several limitations. First, it is not guaranteed to be accurate (or even available) at any given point in time. Since it can be disabled at any time by any application (causing all its records to be purged), it cannot be relied upon for mission-critical applications such as backup. Second, enumerating all changed files will require a full scan through the Change Journal in which every changed file may contribute large numbers of entries. If only some of the entries in the Change Journal are to be used to back up files, processing time and memory must be wasted skipping over the irrelevant entries. Third, with a (conservative) estimate of 100 bytes per entry, memory and persistent storage overhead will be high. This problem is compounded by the fact that a single file may generate multiple entries, further lengthening the Change Journal. Fourth, each and every addition of a Change Journal record for a file will require that file's entry in the Master File Table (MFT) be atomically and persistently updated (i.e., updated as a single transaction and retained even if the system should fail). Requiring atomic transactions should be avoided as much as possible, and the Change Journal requires an atomic transaction for each entry, regardless of the number of entries generated by a file. Finally, the Change Journal's representation of file changes requires a large amount of memory.

U.S. Pat. No. 5,684,991 to Malcolm, issued Nov. 4, 1997, titled "Modification Metadata Set, Abstracted from Database Write Requests," describes another approach to speed up backup operations. According to Malcolm, whenever a write command is issued to write data to storage, a data set is added to a database identifying the subset of the file that was written. Where multiple data sets relate to the same area of a file, all but the most recent can be discarded. Where multiple data sets relate to contiguous areas of a file, they can be merged into a single data set. The database can then be used to simplify backup operations.

But the focus of Malcolm is to speed backup times by backing up only those parts of a file that have changed since the last backup operation. Malcolm may speed up backup operations, but recovering an archived file will generally be slower. To recreate a file from a tape, each separate archive operation must be scanned to determine whether any portion of the file is saved on that tape. Conceivably, recreating a file could require reading a segment of each tape. Second, Malcolm specifies no structure for the database that could improve performance. Without a structure specifically geared toward efficiency, inserting or deleting records can be time-consuming. Third, Malcolm provides no mechanism for ordering files for backup. Backup tools that must archive files in a particular order may be unable to use Malcolm. Fourth, Malcolm makes no provision for archiving files based on past checkpoints. Malcolm archives all files that have changed since the last archive operation, regardless of when the change occurred. Fifth, there is no robust and reliable provision to quickly identify the (usually relatively small) set of files that have changed since the last backup pass. Finally, Malcolm requires adding a data set to the database for each write command issued. Duplicates are eliminated through an optimization step.

Accordingly, a need remains for a system to identify files for backup that is always available, organizes the identified files in an easy way, and avoids repeatedly marking files for archiving.

SUMMARY OF THE INVENTION

When a volume is created, a Modified Files List (MFL) is established and an epoch timestamp (identifying an important point in time for the volume) is set. Whenever a file is first added to or changed on the volume, a corresponding entry is inserted in the MFL. Whenever a file is deleted from the volume and had a corresponding entry in the MFL, the corresponding entry is deleted. At any time, the epoch timestamp can be updated. An epoch timestamp earlier than the current epoch timestamp is selected for archiving purposes. The files inserted into the MFL before the selected epoch timestamp are enumerated and archived using a backup tool. After the backup tool turns off a file's data and metadata archive bits, the corresponding entry is removed from the MFL.

The foregoing and other features, objects, and advantages of the invention will become more readily apparent from the following detailed description, which proceeds with reference to the accompanying drawings.

DETAILED DESCRIPTION OF THE PREFERRED EMBODIMENT

Figure 1:
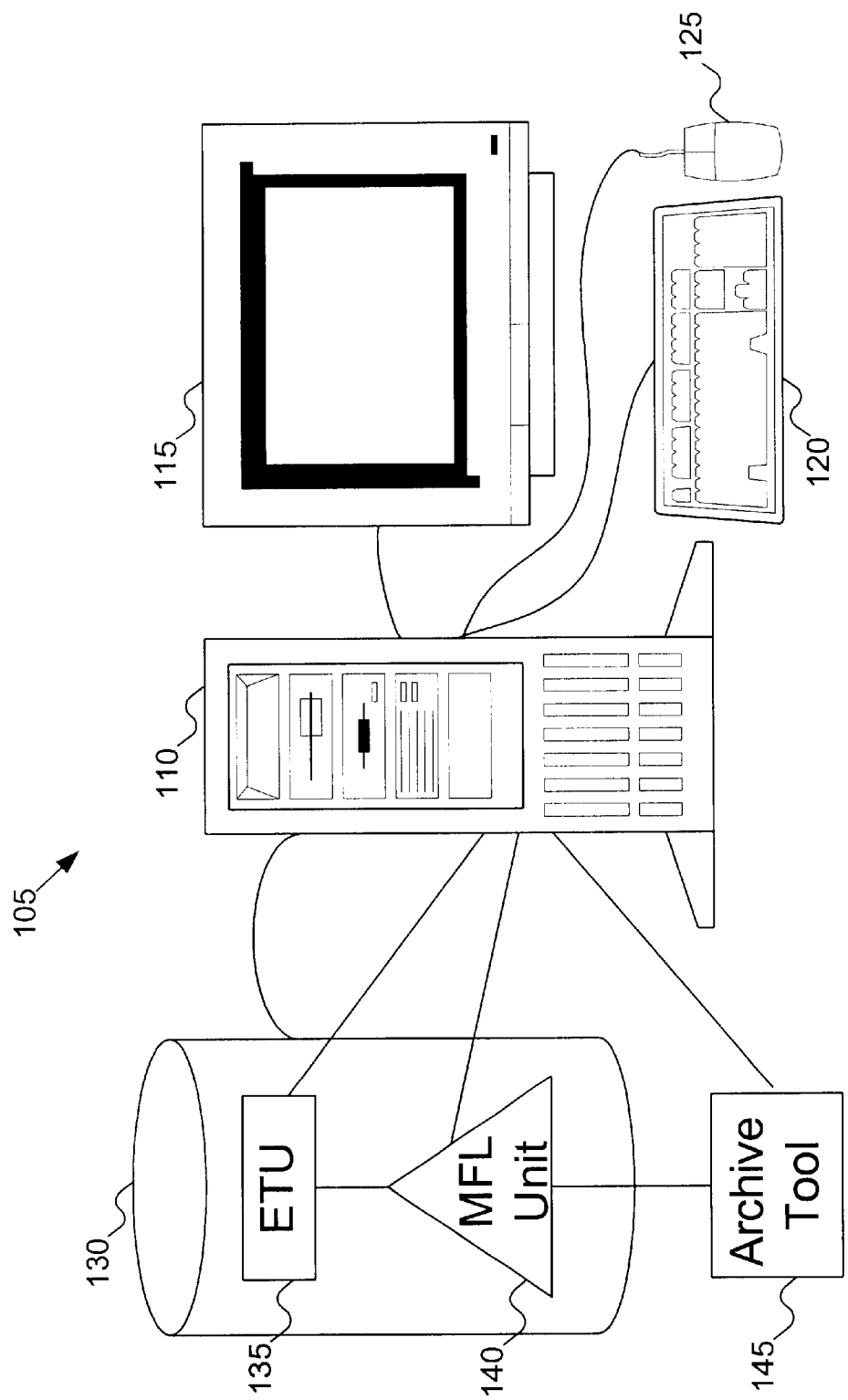
FIG. 1 shows a computer system on which the preferred embodiment could be implemented.

FIG. 1 shows a computer system 105 on which a Modified Files List (MFL) can operate. Computer system 105 includes a computer 110, a monitor 115, a keyboard 120, and a mouse 125. Optional equipment not shown in FIG. 1 can include a printer and other input/output devices. Also not shown in FIG. 1 are the internal components of computer system 105: e.g., a central processing unit, memory, etc. Computer system 105 can also be connected to a network (not shown).

A storage device 130 is coupled to computer 110 as part of computer system 105. Storage device 130 can store volume 205 (see FIG. 2). A person skilled in the art will also recognize that storage device 130 can store multiple volumes, or be part of a large volume spanning multiple storage devices. Storage device 130 includes an epoch timestamp unit 135 for recording important points in time for each volume on storage device 130. Storage device 130 also includes an MFL unit 140 for constructing an MFL for each volume on storage device 130. In the preferred embodiment, epoch timestamp unit 135 and MFL unit 140 are implemented in software. However a person skilled in the art will recognize that epoch timestamp unit 135 and MFL unit 140 can be implemented in other ways, for example, in hardware. Similarly, although shown as being integrated with storage device 130, a person skilled in the art will recognize that epoch timestamp unit 135 and MFL unit 140 can be located elsewhere within computer system 105.

Computer system 105 further includes an archive tool 145. Archive tool 145 is used to archive files stored on storage device 130. Archive tool 145 uses an MFL created by MFL tool 140 to determine which files are to be archived.

Figure 2:
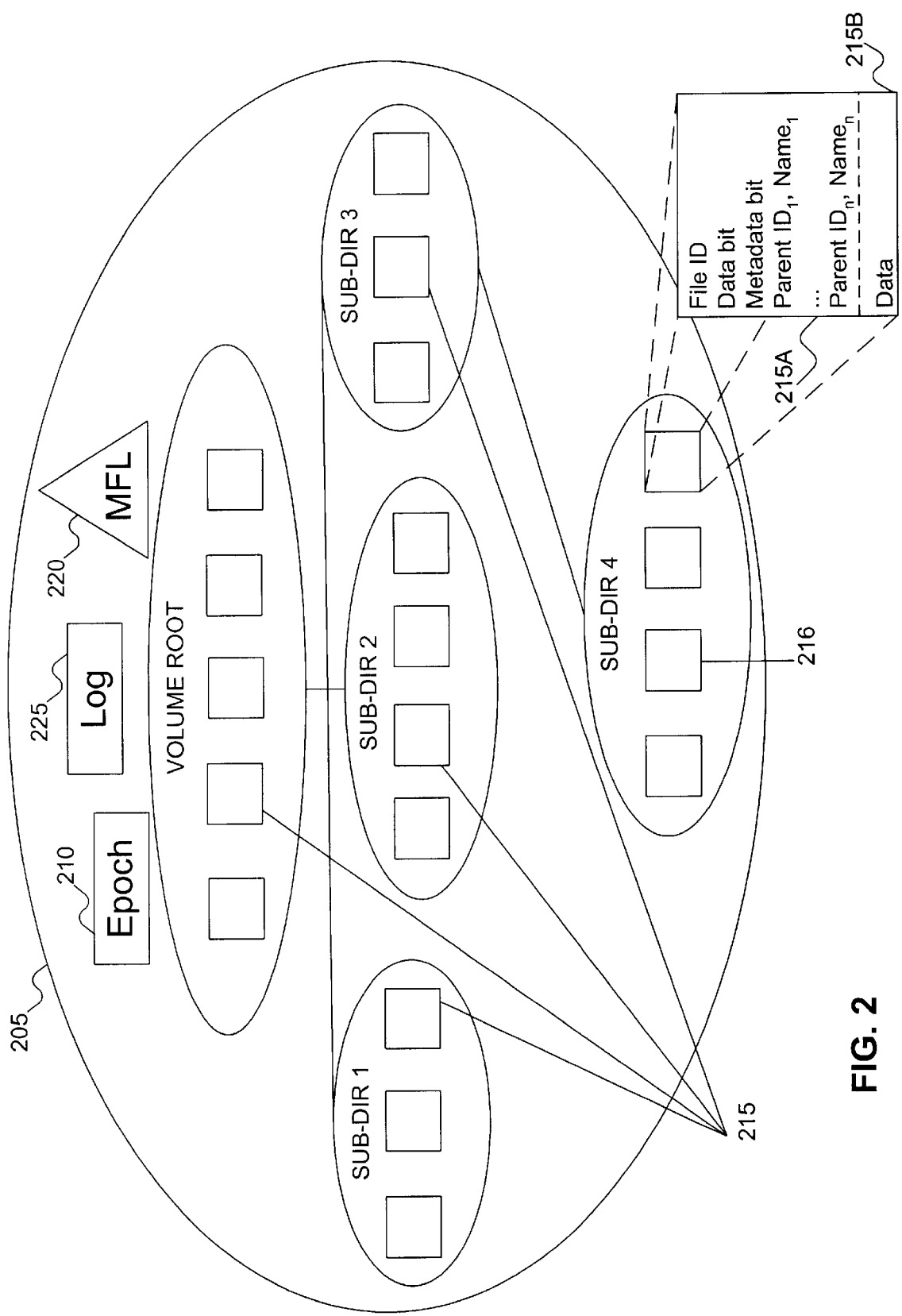
FIG. 2 shows a representation of a volume of files according to the preferred embodiment.

FIG. 2 shows a volume 205 on which the MFL is implemented. A volume is a collection of files stored together, which may or may not be related. Volume 205 includes an epoch field 210. Epoch field 210 holds a timestamp identifying the most recent important point-in-time declared by the system administrator. Epoch timestamps are used to delimit which files are to be processed by any given backup operation. When a file first needs to be backed up its MFL entry is marked with the current epoch. Then, when a backup operation is initiated, the system administrator selects an earlier epoch timestamp (sometimes called a way-point epoch timestamp). All files marked with epoch timestamps earlier than the selected epoch timestamp are then backed up.

When volume 205 is first created, epoch field 210 is set to the creation time of volume 205. System administrators may declare a new epoch at any time for volume 205, at which point the value of epoch field 210 is overwritten by the current time.

Epoch field 210 is stored in the persistent state information of volume 205. As with all persistent state information, any changes made to the epoch field are logged so that the changes will survive a failure of the storage system. Any attempt to read an updated epoch field 210 before it has been made persistent will block, i.e., will be prevented, until the update to epoch field 210 has been safely written to disk.

Volume 205 includes a number of files 215. The exact number of files 215 stored in volume 205 is not important. Although files 215 are shown in FIG. 2 as being organized in a tree structure, a person skilled in the art will recognize that other structures can be used to store files 215. Each file 215 includes a metadata block 215A and a data block 215B. Data block 215B stores the actual data of the file. Metadata block 215A stores metadata (data about the file). Metadata stored in metadata block 215A includes the file ID, the data and metadata archive bits, and all names for the file (the parent IDs (also known as directory names) and file names used in those directories).

Volume 205 also includes an MFL 220. MFL 220 is shown in further detail in FIG. 3. MFL 220 is a B+ tree structure. The structure of a B+ tree is known in the art. Use of the B+ tree structure allows substantial scalability (billions of entries) while maintaining extremely small and predictable add/remove/lookup times, reducing computer system overhead for maintenance of such a structure to negligible levels. Use of the B+ tree structure also allows enumeration of all files modified in a volume, since its last backup, in time that is linear to the number of changed files.

Figure 3:
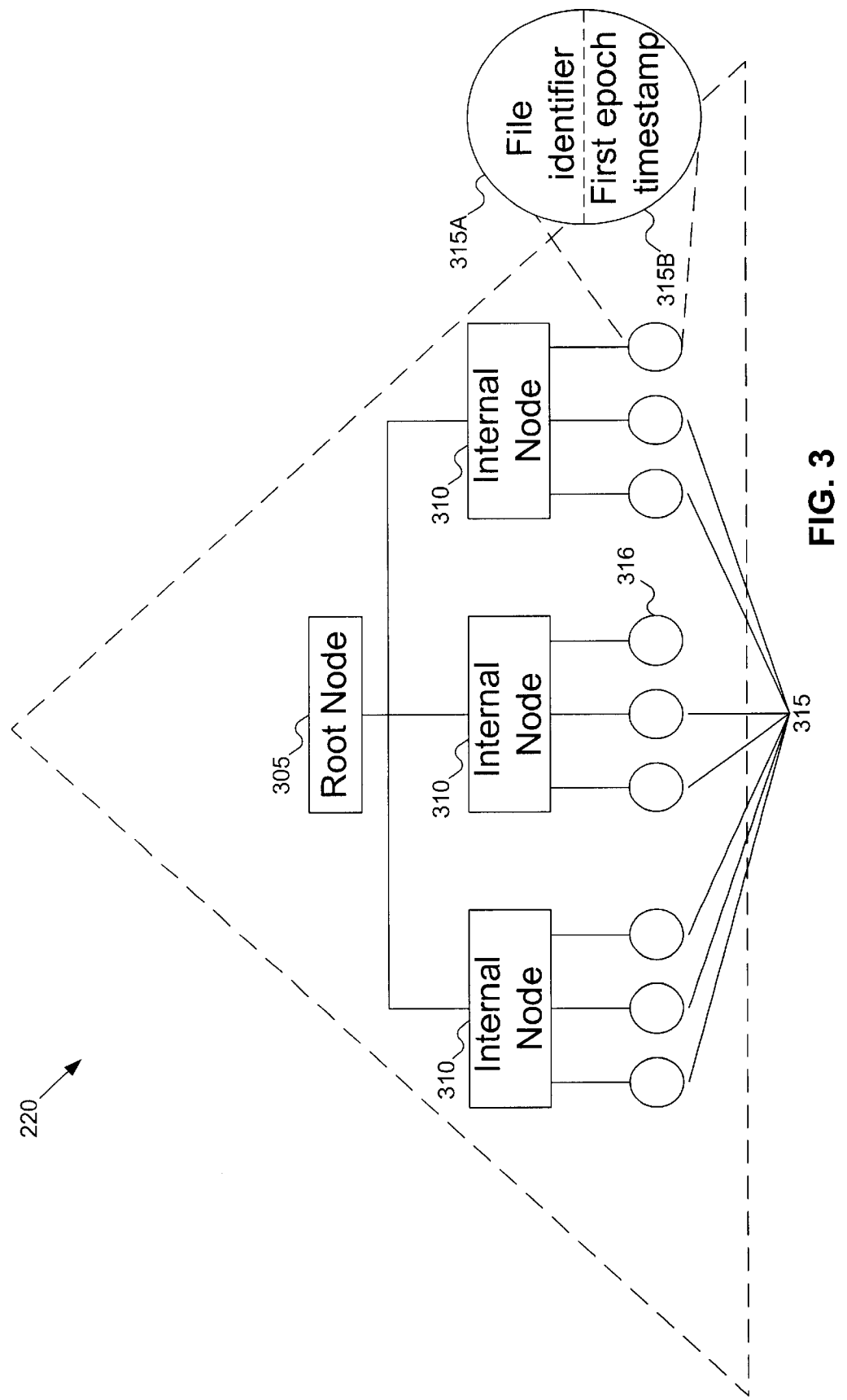
FIG. 3 shows the structure of a B+ tree.

With reference to FIG. 3, MFL 220 includes a root node 305, internal nodes 310, and leaf nodes 315. The leaf nodes identify files in volume 205 that need to be backed up. For example, leaf node 316 can refer to file 216 (see FIG. 2). In a B+ tree structure, all leaf nodes 315 are at the same level in the tree, and are sorted. A person skilled in the art will recognize that the number of internal nodes can be other than three in a B+ tree, and that there can be more than one level of internal nodes. A person skilled in the art will also recognize that there can be other than three leaf nodes attached to the lowest level of internal nodes in MFL 220.

Each leaf node 315 in MFL 220 stores two elements: a file identifier 315A (file ID) and an epoch timestamp 315B. File ID 315A identifies a file on volume 205 that has been modified since it was last archived. Each file has one file ID, regardless of the number of hard links (i.e., different names) the file has. A person skilled in the art will recognize that a file ID is not necessarily related to the file's first name. Epoch timestamp 315B identifies the first epoch in which the file identified by file ID 315A was modified since it was last archived.

Returning to FIG. 2, volume 205 also includes a transaction log 225. Transaction log 225 persistently records all changes to the MFL that have not yet been stored in the MFL. This ensures that all modifications can be quickly, completely, and efficiently recovered in the face of unexpected shutdowns and crashes.

In the preferred embodiment, each volume has its own MFL. However, a person skilled in the art will recognize that, with minor modifications, it would be possible for a single MFL to span multiple volumes, for example, by including the volume identifier with the file identifier in the MFL. A person skilled in the art will also recognize that the functions that support use of the MFL can be shared across multiple volumes.

Upon the creation of volume 205, the storage system must set epoch field 210 in the persistent state information of volume 205 to the current time. Before any files 215 are created in new volume 205, the storage system must also initialize the volume's persistent MFL data structure 220 so that it contains only a root node.

When volume 205 is deleted, the storage system must reclaim the persistent state used by MFL 220 along with all the other storage system structures and data blocks contained within volume 205.

MFL 220 can be verified or repaired, if needed. During a verification pass over any given volume, there are two levels of inspection of the MFL facility. The first (and lesser-effort) level of scrutiny involves checking that entries (if any) of MFL 220 are consistent, both internally and with the file(s) described. An error is reported if the MFL contains any duplicate entries. For each entry, an error is also reported if the corresponding file does not exist, if the file does not have either of its archive bits set, or if the value of the entry's epoch field is larger than the volume's current epoch value 210. The second (and higher-effort) level of scrutiny involves performing the check described above plus verifying that all of files 215 on volume 205 are consistent with MFL 220. This involves sweeping through all files 215 in volume 205. For any given file examined during this sweep, an error is reported if either of the file's archive bits are set but no corresponding MFL entry is found, or if neither of the file's archive bits is set but an MFL entry for the file is found.

During a repair pass over any given volume, MFL 220 is reinitialized and all memory it uses is released before any file-level repair commences. Epoch field 210 in the persistent state information of volume 205 is reset to the current time. As the storage system's internal file structures are rebuilt, an entry is added to MFL 220 for each file 215 whose archive bit(s) are set when neither had been set before.

Some storage systems allow for the creation of Copy-On-Write (COW) clone volumes. These COW volumes serve to create a moment-in-time, read-only snapshot of the entire original volume while transparently allowing continuing modifications. In effect, the COW volume duplicates volume 205 at the moment the COW clone is created. This allows for the possibility of archiving the original volume 205 while changes can be made to the COW clone. The storage system initializes and maintains an MFL for the COW clone as described above, just as it would for any other volume. The original volume 205, now unchanging relative to the moment the clone was created, can be backed up without concern for changes in the files of the clone. When the backup of original volume 205 is complete (and its MFL has been correspondingly emptied), the clone may be reintegrated back into original volume 205. During this undone operation, the clone volume's epoch value, its MFL, and all files named by its MFL are folded back into original volume 205.

Figure 4:
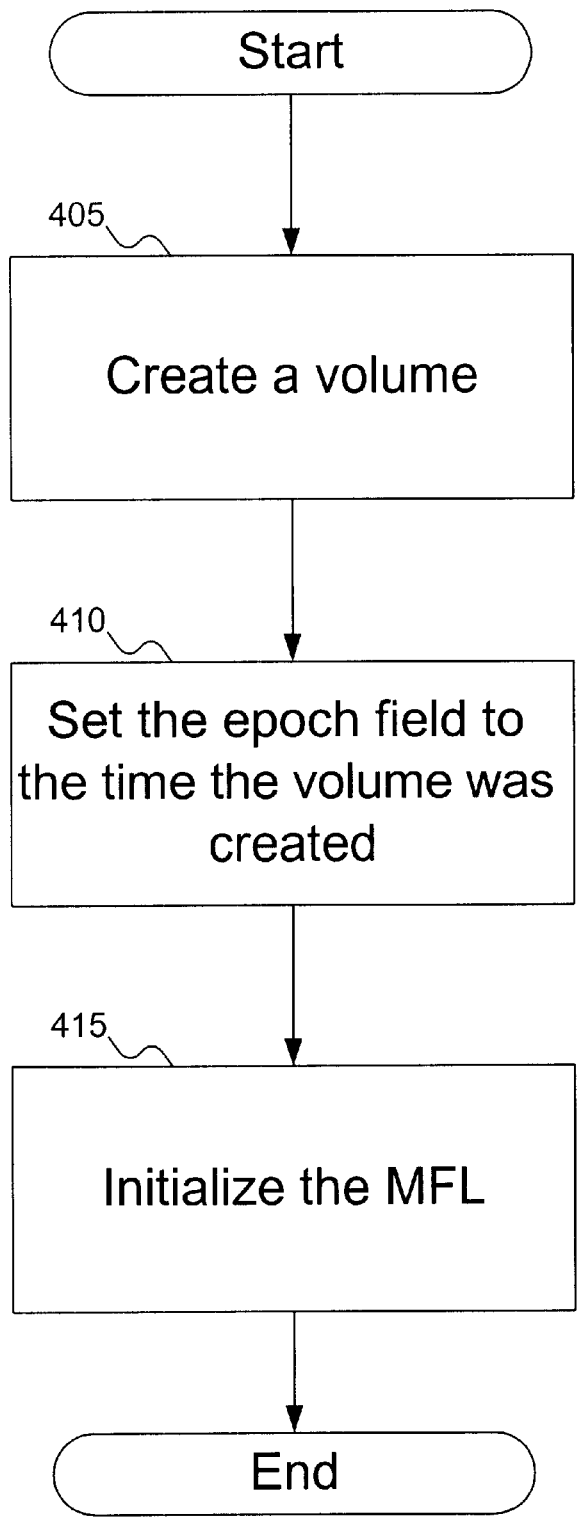
FIG. 4 shows a flowchart of the method for creating a new volume according to the preferred embodiment.

FIG. 4 shows a flowchart of the additional steps necessary when creating a new volume according to the preferred embodiment. At step 405, the volume is created. Volume creation is known in the art. At step 410, the epoch field for the volume is initialized to the volume's creation time. Then, at step 415, the volume's MFL is initialized. Initially, the MFL contains only the root node, as no files have yet been modified.

Figure 5:
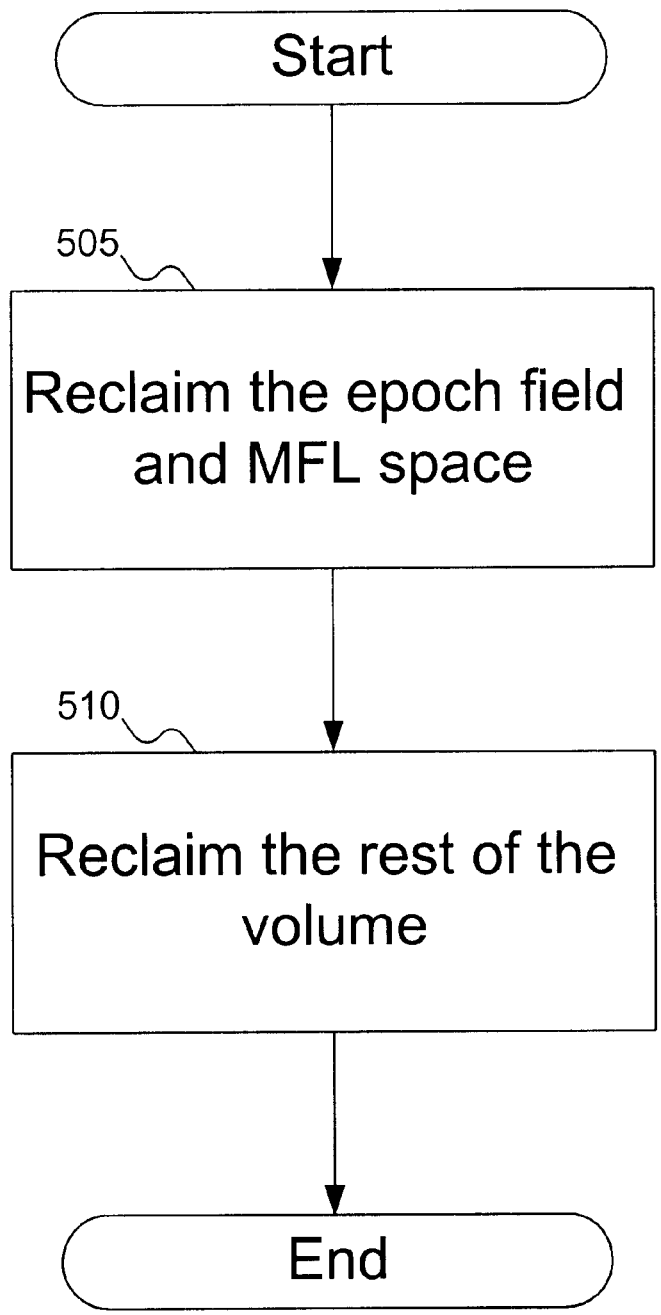
FIG. 5 shows a flowchart of the method for deleting a volume according to the preferred embodiment.

FIG. 5 shows a flowchart of the additional steps necessary when deleting a new volume according to the preferred embodiment. Volume deletion is known in the art. At step 505, the storage system reclaims the persistent state information used by the epoch field and the MFL. Then, at step 510, the storage system structures and data blocks of the volume are reclaimed.

Figure 6:
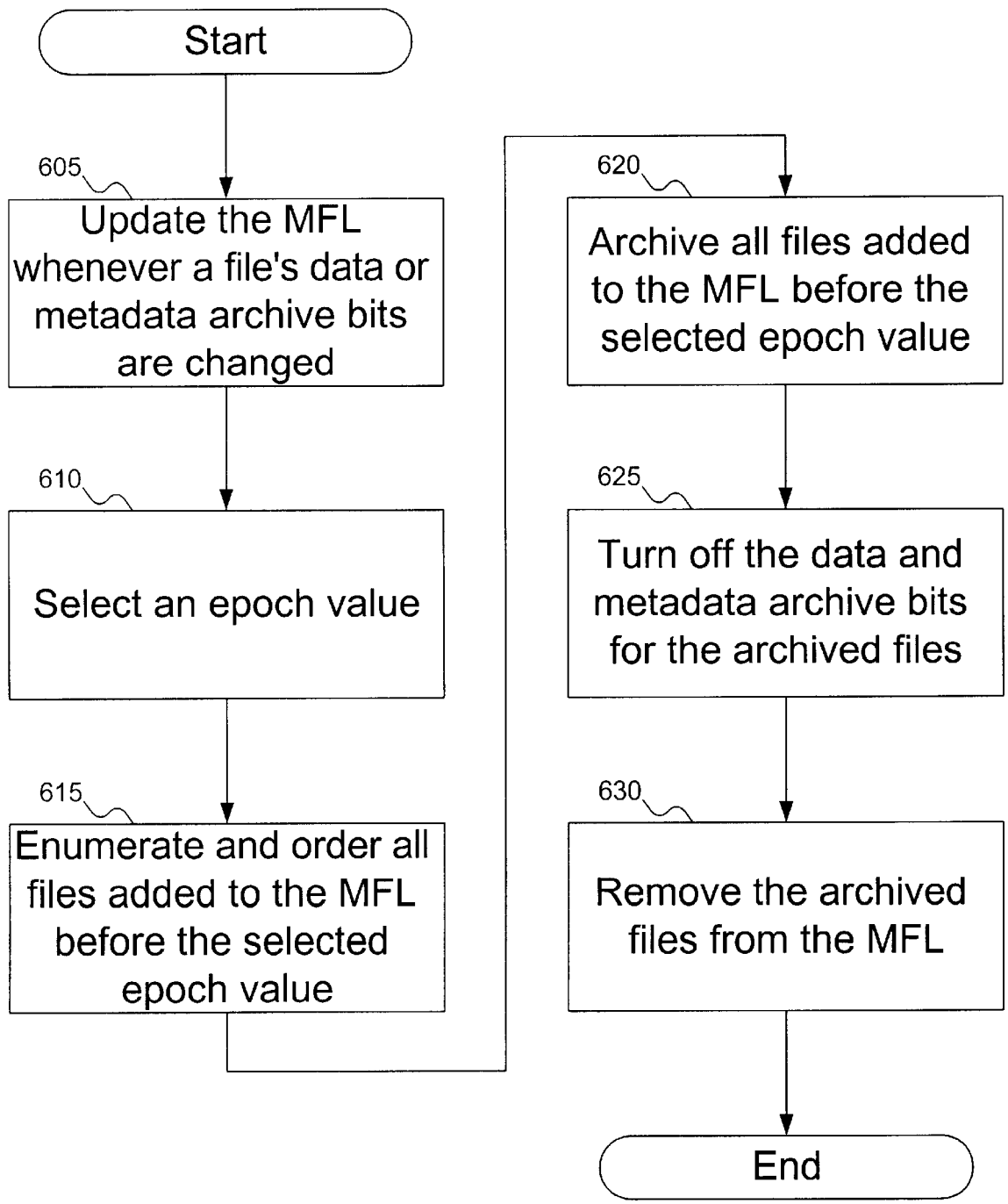
FIG. 6 shows a flowchart of the method for using the Modified Files List (MFL) to archive files according to the preferred embodiment.

FIG. 6 shows a flowchart of the method for using the Modified Files List to archive files according to the preferred embodiment. FIG. 6 will first be discussed briefly in overview. The specifics of how an MFL is handled will then be described.

At step 605, the MFL for the volume is updated as files are created, modified, or deleted. At step 610, the system administrator selects an epoch value. This value will identify which files will be archived. In the preferred embodiment, the selected epoch will be earlier than the current epoch of the volume. In this way, the backup operation will not affect other storage system operations, as newly added entries to the MFL will not be backed up in the active archive operation. If files are first created or modified in the newly-declared epoch, their entries will be inserted in the MFL but will not appear in the enumeration of the MFL. And if the files were first created or modified in an earlier epoch, their entries are already present in the MFL and do not have to be inserted. Further use of files on the volume will not impact the archive operation. If a file is deleted after enumeration and before the archive operation, the corresponding MFL entry for the file will be removed when the file is deleted. When the backup tool is unable to locate the file, it will continue with the next file in the enumeration.

At step 615, all files identified in the MFL that were first modified before the selected epoch are enumerated and ordered. This step is performed in the preferred embodiment when the backup tool requires files to be archived in a particular order. Ordering can be necessary because the MFL stores entries according to file IDs, which do not necessarily correspond with the order in which files must be archived. If the backup tool does not care about file order, the ordering portion of step 615 can be skipped.

At step 620 the enumerated and ordered files are archived. At step 625, the data and metadata archive bits of the enumerated and ordered files are turned off. Finally, at step 630, the entries in the MFL for the archived files are removed (i.e., the leaf node for the file is removed from the MFL). For example, after file 216 is archived and its archive bits are turned off, entry 316 can be removed from MFL 220.

In the preferred embodiment, steps 620, 625, and 630 are performed separately for each file: i.e., a single file is archived, its data and metadata bits are turned off, and the entry in the MFL is removed. Then the next file is archived, its data and metadata bits are turned off, and the entry in the MFL is removed, etc. In this way, the backup operation only has to lock one file at a time, and other file operations can continue in parallel with the archive operation.

In the preferred embodiment, insertion and removal of entries in the MFL are performed by the storage system. When the first of a file's data and metadata bits are turned on, the storage system adds the file to the MFL. In this way, a file is added only once to the MFL. For example, assume a file is modified for the first time, and its data archive bit is turned on. The storage system adds an entry for the file in the MFL. If the file is later modified again, since the data archive bit is already turned on, the storage system will not add another entry to the MFL for that file.

In the preferred embodiment, the act of setting the first of either of a file's archive bits and the subsequent act of inserting an entry into the MFL as described above in response to that event are carried out within the context of the single storage system transaction. This guarantees that either both operations take place or neither does. It also ensures that only one MFL entry identifies a file for archiving, no matter how many times the file may be modified.

It is important to note that in the preferred embodiment, the storage system does not insert a second entry into the MFL as a result of subsequent modifications to a given file as long as either of its archive bits remains turned on. Thus, not only are MFL operations already extremely efficient because of the use of a B+ tree, but the MFL need only be updated the first time a file is modified since the last backup cycle in which the file was saved. In particular, each succeeding change to the file under these conditions requires no MFL operations whatsoever. This aspect of the invention greatly reduces the already low computer system overhead imposed by MFL maintenance.

Deletions from the MFL are handled similarly. Whenever either of a file's data bit or metadata bit is turned off such that both bits are off, the storage system removes the file from the MFL. The data and metadata bits could be turned off for a number of reasons: for example, the file's image has been safely stored by the backup system (and the backup tool turned the data and metadata bits off), or the file has been deleted from the storage system. A person skilled in the art will recognize that there can be other reasons that a file's data and metadata bits are turned off.

As with insertion, turning off a file's archive bits so that both bits are off and removing the file's entry from the MFL are carried out within the context of the single storage system transaction. This guarantees that either both operations take place or neither does, insuring that turning off a file's archive bits (and thus qualifying it for backup) unfailingly results in the removal of its MFL entry.

In the preferred embodiment, the function that deletes an entry from the MFL includes a return value that informs the storage system of whether any entries remain in the MFL. This allows the storage system to avoid attempting to perform a backup operation when no files require archiving. However, a person skilled in the art will recognize that this return value is not necessary, since the storage system could determine the state of the MFL through enumeration.

In the preferred embodiment, the entries in the MFL can be enumerated. Enumeration efficiently allows for the identification of an exact set of files that will be included in this particular incremental backup. The storage system calls a function that enumerates up to a given maximum number of entries. The maximum number of entries is determined by the size of a buffer used to store the entries. If fewer entries exist in the MFL than the buffer has space for, only as many entries as exist are returned. Enumeration can begin at a given point within the MFL (determined by a pointer to the next entry to enumerate), or can be reset to the beginning of the MFL. Enumeration allows the storage system to order the files for archiving, if required by the backup tool.

Enumeration can also be used to quickly determine whether any files requiring backup in the context of the current epoch exist within a volume. If the storage system's function call to enumerate the first entry in a volume's MFL returns the fact that no such entry exists, then the storage system can be confident that no modified files exist in that volume either.

The storage system is responsible for translating the file's numerical ID found in each MFL entry to a set of fully-qualified (from the volume's root directory) pathnames by which that file may be referenced. For example, the fully-qualified path to file 216 in volume 205 of FIG. 2 would be Volume root/Sub-dir3/Sub-dir4/filename. (Note that the volume's root directory is different from the root node of the MFL: the volume's root directory is the root of the tree structure of all the files in the volume.) Although most files will likely have exactly one such identifying pathname, support of hard links introduces the possibility that some files will have two or more identifying pathnames. Implementers of backup software that wish to lay out the volume's set of modified files on tape in a specific tree-walk order will need to enumerate the entire MFL in order to compute the proper sort order.

A companion function allows the storage system to reclaim any memory or other resources the storage system is keeping in support of MFL enumeration, if any. This companion function is useful where enumeration is prematurely ended. For example, if the implementation of the enumeration function has the function writing a pointer in memory to the last file enumerated and the system administrator aborts the backup operation, the companion function will release the memory storing the pointer.

As discussed above, it is the setting of the file's data or metadata archive bits that trigger insertion of an entry in the MFL. When a file is created or salvaged (i.e., a file that was marked deleted is recovered), the file's archive bits are set. This triggers the insertion of an MFL entry for the file. Renaming a file can also cause a file's archive bits to be set and an entry to be inserted into the MFL.

MFL allows for files to be modified while a backup operation is being performed. If a file that is to be backed up is being edited on the storage system, the blocks that are being modified are duplicated. The edits are saved to the duplicate blocks. After the backup operation is completed and the file is closed, the new blocks are written over the old blocks of the file. This will cause the data or metadata archive bits to be set and a new entry will be added to the MFL for the file, to be archived at a later time.

When a file is deleted from the storage system, it potentially joins the ranks of the other files in the volume that have also been deleted yet whose contents have not yet been garbage-collected. If either of the file's archive bits were set at the time of its deletion, then the storage system must delete the MFL entry for that file. On the other hand, a later purge operation on that deleted file does not have any impact on the MFL portion of the storage system, and no additional operations are required.

Creating a hard link to a file changes the file's metadata, as it must now store the new, additional name by which it is known (and the parent directory ID in which that new name now exists). If this is the first time that either of the file's data or metadata archive bits have been turned on, then this is the first change experienced by the file since the last backup cycle and the storage system inserts an entry in the MFL as described above. Again, because of atomicity of transactions, creating the hard link and inserting the MFL entry are a single transaction.

Deleting a hard link from a file also changes the file's metadata, as it must now remove the defunct name (and the parent directory ID in which this name no longer exists) from its persistent store. If the last remaining name of a file is to be destroyed by this operation and if either of the underlying file's data or metadata archive bits was already on before the beginning of this operation, then its MFL entry is deleted as described above. If at least one name will remain for this file after this operation, the file will not be deleted. In this case, its metadata archive bit must be turned on if the metadata archive bit is currently off. If the metadata archive bit is turned on in this way and the data archive bit is off, then this represents the first change to this file since the last backup cycle, and an entry for the file is inserted in the MFL as described above.

One of the significant aspects of our MFL invention is that the MFL has only one entry for a modified file, regardless of the number of hard links it has. This prevents files with multiple hard links from being backed up multiple times, once per link.

Comparison of MFL with the Change Journal (described above) reveals easily discernible significant differences:

Accuracy/Availability: The Change Journal is not guaranteed to be accurate (or even available) at any given point in time. Since it can be disabled at any time by any application (causing all its records to be purged), it cannot be relied upon for mission-critical applications such as backup. The MFL, on the other hand, is always present, always accurate, and cannot be erased or disabled by mere user-level applications.

Access Performance: Because of its flat-file, multiple-entry-per-file approach, the Change Journal performs significantly worse than MFL (during any given time period during which the Change Journal accurately reflects the state of changed files in the volume, which as shown above is not even guaranteed). Shortcuts can be used to see if the Change Journal has recorded any changes to any particular file, namely the ability to quickly find the entry corresponding with the last USN currently associated with the file (unless, of course, the Change Journal has been truncated). However, enumerating all changed files will require a full scan through the Change Journal in which every changed file may contribute a large number of entries. MFL, on the other hand, guarantees that every changed file will contribute exactly one entry, and locating that entry is a simple task.

Overhead: Memory and persistent storage overhead will be higher for the Change Journal than with MFL. Each MFL entry is exactly 20 bytes long (8 bytes for the parent ID, 8 bytes for the file ID, and 4 bytes for the Epoch value), compared with a (conservative) estimate of 100 bytes per Change Journal entry.

Any changed file contributes exactly one entry to the MFL, whereas the number of entries per changed file in the Change Journal is directly proportional to the number of changes to that file. For example, if file X was modified one hundred times, then one hundred entries will exist for that file, contributing (conservatively) 10,000 bytes to the overall Change Journal. The MFL will always consume exactly 20 bytes for its single entry.

Also, each and every addition of a Change Journal record for a file will require that file's entry in the Master File Table (MFT) be atomically and persistently updated. With MFL, such an atomic update on the file and its MFL entry happens only on the file's first modification.

Finally, since the MFL has a much more compact representation for this kind of information than the Change Journal, its memory footprint will be smaller. This ensures that more computer system memory is available to hold actual live payloads such as user file buffers.

Backup Epoch Delineation: The Change Journal does not supply a robust, efficient way of identifying which changes are to be associated with any given backup period. It does not supply any facility that attempts to emulate the epoch infrastructure. In contrast, by using a way-point epoch timestamp that is earlier than the current epoch for a volume, MFL allows archiving of files that were first changed prior to the way-point epoch timestamp.

Application Complexity: Documentation for the Change Journal warns that applications using a volume's Change Journal must be prepared to "gracefully handle the situation when a journal is disabled when [this] application is still using the journal." Avoiding this failure mode in application-level code, especially when any user-level application may arbitrarily disable (and thus truncate) the Change Journal for that volume at will at any time, and as many times as it wishes to, adds significant complexity. The MFL can become unavailable due only to the same types of catastrophic disk erasure and out-of-space conditions that would also invalidate the Change Journal.

MFL also has advantages as compared with Malcolm. First, as noted above, Malcolm backs up only the changed portions of a file. Recovering a file under Malcolm can require accessing each and every backup tape since the last full archive of the storage system. In contrast, MFL archives a complete file, so only one tape must be accessed to recover a file: either the original full backup, or the most recent incremental backup archiving the file. Second, Malcolm specifies no structure for the database that could improve performance. Accessing the database of changes could require significant time allotment. Third, Malcolm requires inserting a database record each time a file is changed. MFL requires an entry be inserted only the first time the file is modified. Fourth, because Malcolm requires inserting an entry into the database each time a file is changed, the space requirements of the database for a single file are unbounded. Although overlaps and contiguous blocks in the database can be optimized into fewer records, this requires special handling.

In contrast, MFL has exactly one entry for each file, and the size of each entry is fixed. Finally, Malcolm makes no provision for archiving files based on past checkpoints. Malcolm assumes that other storage system activity will cease while files are being archived from the volume. MFL, on the other hand, allows file accesses to continue while a backup operation is performed by simply declaring a new epoch. Even though new entries may be added to the MFL, they will have an epoch value greater than the cut-off value for the backup operation and will not be archived.

Here are two fairly typical incremental backup scenarios, comparing traditional backup operations with the use of MFL:

1. Volume with 100 modified files out of 10,000 total files

The traditional, non-MFL approach must inspect each of the 10,000 files in the volume, bringing each file's object into memory. In the process, it will likely throw out a fair number of other in-memory file objects. If the changed files are randomly scattered across the volume, the processor and disk I/O may be fast enough to maintain the necessary streaming rate to the tape device. If the modified files occur in clusters, however, there may be a significant periods of time before the next modified file may be located and its contents written out, causing undesirable shoe-shining.

An MFL-enabled approach simply requires the one hundred entries on the MFL to be enumerated. Only those modified file objects will be brought into memory while writing out their contents to tape, thus greatly reducing memory poisoning. Since 99% of the files on the volume have not been modified, the processor and I/O cycles expended during the traditional case's tree walk result in wasted work, whereas all cycles in the MFL case are used constructively. In fact, the effort expended by the MFL approach is linear to the number of modified files instead of the total number of files in the volume as in the traditional case.

2. Volume with 1,000 modified files out of 1 million total files

Compared with the previous scenario, this volume has a hundred times more files but only ten times more modified files. All of the problems encountered by the traditional case only get worse here. This time, 99.9% of files on the volume have not been modified, and even more processor and I/O cycles are wasted in the traditional case. Also, the amount of time wasted in walking a file tree of that size would take a very long time, potentially. violating administrative windows in which the backup operation must run to completion. With this size volume, the traditional case is almost guaranteed to severely poison memory and to visibly interfere with the file server's ability to service live client requests.

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

We claim:

1. A method for using a modified files list to store a list of files, each file including data and metadata bits, to back up on a volume stored on a storage medium on a computer system, the method comprising:

establishing an epoch timestamp in a volume;

organizing the modified files list as a B+ tree;

updating the modified files list as a file is added to, removed from, or changed on the volume;

selecting a way-point epoch timestamp; and using a backup tool to archive all files listed in the modified files list which were added to the modified files list before the way-point epoch timestamp.

2. A method according to claim 1 further comprising replacing the established epoch timestamp with a new epoch timestamp.

3. A method according to claim 1 wherein updating the modified files list includes inserting an entry to the modified files list whenever the file's data or metadata bits are turned on.

4. A method according to claim 3 wherein updating the modified files list further includes storing the established epoch timestamp in the modified files list for the file added to or changed on the volume.

5. A method according to claim 1 wherein updating the modified files list includes deleting an entry from the modified files list whenever the file's data and metadata bits are turned off.

6. A method according to claim 1 further comprising enumerating the files in the modified files list which were added to the modified files list before the way-point epoch timestamp was selected.

7. A method according to claim 6 wherein enumerating the files in the modified files list includes ordering the enumerated files.

8. A method according to claim 1 wherein using a backup tool includes deleting an entry from the modified files list after the backup tool turns off the file's data and metadata bits.

9. A computer-readable medium containing a program implementing an algorithm for using a modified files list to store a list of files, each file including data and metadata bits, to back up on a volume'stored on a storage medium on a computer system, the program comprising:

timestamp software to establish an epoch timestamp in a volume;

organizational software to organize the modified files list as a B+ tree;

update software to update the modified files list whenever a file is added to, removed from, or changed on the volume;

selection software to select a way-point epoch timestamp; and backup software to archive all files listed in the modified files list which were added to the modified files list before the way-point epoch timestamp was selected.

10. A computer-readable medium containing a program according to claim 9 wherein the update software to update the modified files list includes insertion software to insert an entry to the modified files list whenever the file's data or metadata bits are turned on.

11. A computer-readable medium containing a program according to claim 9 wherein the update software to update the modified files list includes deletion software to delete an entry from the modified files list whenever the file's data and metadata bits are turned off.

12. A computer-readable medium containing a program according to claim 9 further comprising enumeration software to enumerate the files in the modified files list which were added to the modified files list before the way-point epoch timestamp was selected.

13. A computer-readable medium containing a program according to claim 12 wherein the enumeration software to enumerate the files in the modified files list includes ordering software to order the enumerated files.

14. A computer-readable medium containing a program according to claim 9 wherein the backup software includes deletion software to delete an entry from the modified files list after the backup tool turns off the file's data and metadata bits.

15. An apparatus for using a modified files list to store a list of files to back up on a volume stored on a storage medium on a computer system, the apparatus comprising:
- a modified files list, wherein the modified files list includes data structures identifying a list of files that have been changed since they were last backed up and the modified files list is organized as a B+ tree;
- a way-point epoch timestamp in the volume;
- an operating system running on the computer system, wherein the operating system is organized to update the modified files list when a file is added to, removed from, or changed on the volume to reflect the way-point epoch timestamp; and
- a backup tool to archive files stored in the modified files list which were added to the modified files list before the way-point epoch timestamp.

16. An apparatus according to claim 15, wherein each data structure includes:
- a file identifier; and
- the epoch timestamp.

17. An apparatus for using a modified files list to store a list of files, each file including data and metadata bits, to back up on a volume stored on a storage medium on a computer system, the modified files list organized as a B+ tree and the apparatus comprising:
- a timestamp unit to establish an epoch timestamp in a volume;
- an update unit to update the modified files list whenever a file is added to, removed from, or changed on the volume;
- a selection unit to select a way-point epoch timestamp; and
- backup tool to archive all files listed in the modified files list which were added to the modified files list before the way-point epoch timestamp was selected.

18. An apparatus according to claim 17 wherein the update unit to update the modified files list includes an insertion unit to insert an entry to the modified files list whenever the file's data or metadata bits are turned on.

19. An apparatus according to claim 17 wherein the update unit to update the modified files list includes a deletion unit to delete an entry from the modified files list whenever the file's data and metadata bits are turned off.

20. An apparatus according to claim 17 further comprising:
- an enumeration unit to enumerate the files in the modified files list which were added to the modified files list before the way-point epoch stamp; and
- an ordering unit to order the enumerated files.

* * * * *

UNITED STATES PATENT AND TRADEMARK OFFICE
CERTIFICATE OF CORRECTION

PATENT NO.     : 6,560,615 B1                                           Page 1 of 1
DATED          : May 6, 2003
INVENTOR(S)    : Zayas et al.

It is certified that error appears in the above-identified patent and that said Letters Patent is hereby corrected as shown below:

Column 1,
Line 54, "in modem systems," should read -- in modern systems, --.

Column 6,
Line 40, "this undone operation," should read -- this unclone operation --.

Column 11,
Line 63, "potentially. violating" should read -- potentially violating --.

Column 12,
Line 50, "a volume'stored" should read -- a volume stored --.

Column 13,
Line 30, "a way-point epoch timestamp" should read -- an epoch timestamp --.
Line 34, "reflect the way-point epoch timestamp;" should read -- reflect the epoch timestamp; --.
Lines 36-38, "modified files list which were added to the modified files list before the way-point epoch timestamp." should read -- modified files list. --.

Signed and Sealed this

Eleventh Day of May, 2004

JON W. DUDAS
*Acting Director of the United States Patent and Trademark Office*